United States Patent [19]

Jones

[11] Patent Number: 4,999,550
[45] Date of Patent: Mar. 12, 1991

[54] AUTOMATIC REAR WIPER CONTROL
[75] Inventor: Christopher W. Jones, Kokomo, Ind.
[73] Assignee: Delco Electronics Corporation, Kokomo, Ind.
[21] Appl. No.: 491,922
[22] Filed: Mar. 12, 1990
[51] Int. Cl.⁵ .............................................. B60S 1/08
[52] U.S. Cl. .................................... 318/50; 318/443; 318/DIG. 2; 15/250.170
[58] Field of Search ...................... 318/34, 35, 37, 41, 318/49, 50, 51, 101, 102, 103, 443, 444, DIG. 2; 15/250 C, 250.12, 250.17, 250.27

[56] References Cited
U.S. PATENT DOCUMENTS 4,336,482  6/1982  Goertler et al. ................... 318/443
4,881,019  11/1989  Shiraishi et al. ................. 318/49 X

FOREIGN PATENT DOCUMENTS 3044011  6/1982  Fed. Rep. of Germany ...... 318/443
3407974  3/1985  Fed. Rep. of Germany ...... 318/443
58-36746  3/1983  Japan .............................. 318/443

Primary Examiner—Bentsu Ro
Attorney, Agent, or Firm—Robert M. Sigler

[57] ABSTRACT

A motor vehicle has front and rear electric motor driven wiper mechanisms including front and rear control switches effective to independently activate and deactivate front and rear wiper operation and front and rear park switches effective to independently provide, for each of the front and rear wipers, automatic wiper parking when the respective control switch is turned off. The vehicle has a driveline transmission with a reverse indicator and a control circuit responsive to the reverse indicator to interconnect the rear wiper motor with the front wiper control switch and disconnect the rear part switch when vehicle reverse operation is indicated.

1 Claim, 1 Drawing Sheet

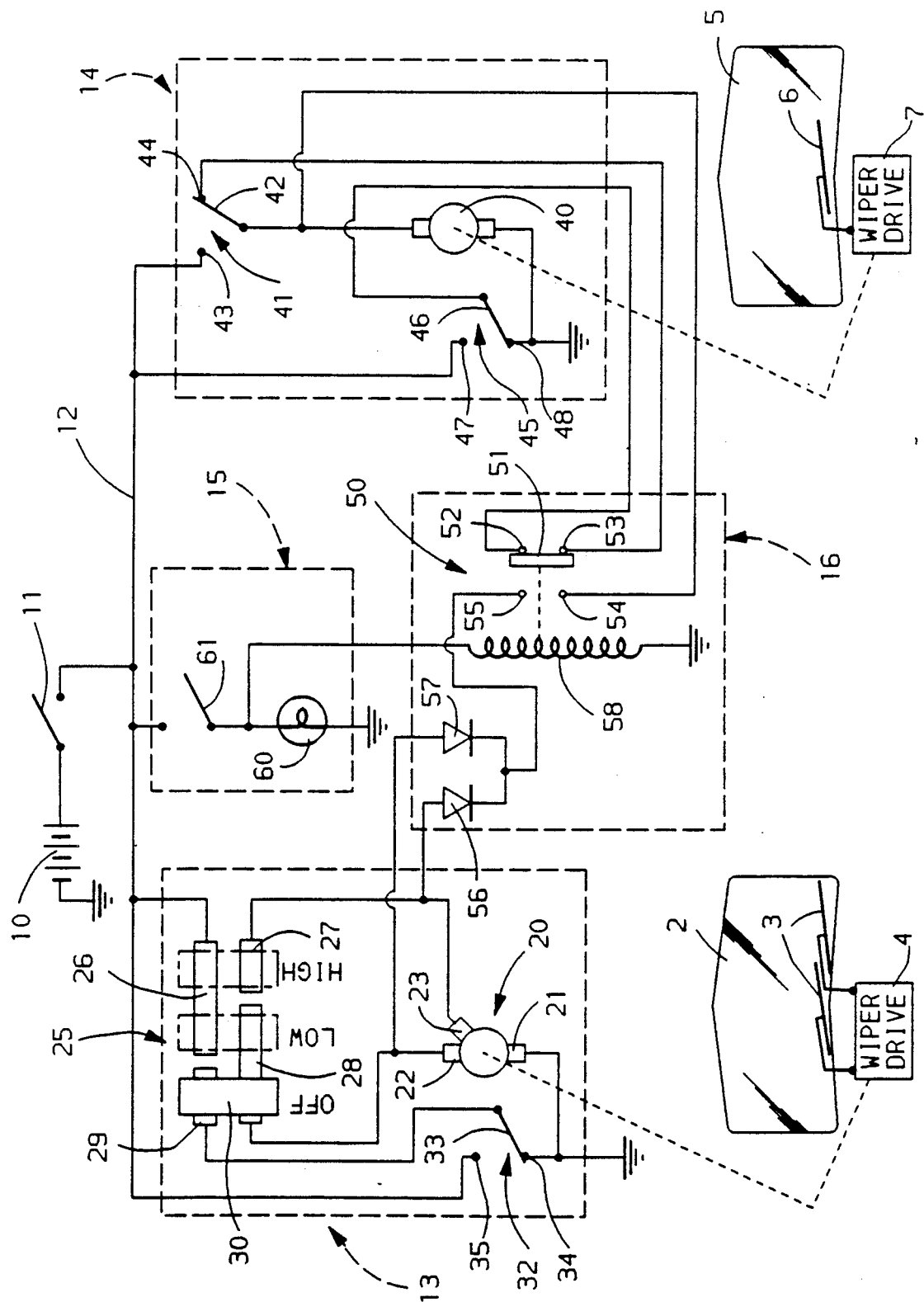

AUTOMATIC REAR WIPER CONTROL

BACKGROUND OF THE INVENTION

This invention relates to a motor vehicle wiper apparatus having both front and rear wiper mechanisms and particularly to a control for such an apparatus. Motor vehicles are known having front wiper apparatus for the windshield and rear wiper apparatus for the rear window; however, the front and rear wipers are separately controlled. The separate control is desirable, since a driver may wish to clean one of the windshield and rear window without operating the wiper on the other. However, when the vehicle is driven in reverse in the rain, the driver may wish the rear wiper to operate for better visibility through the rear window, although it has not been activated along with the front wiper mechanism. At such a time, the driver, having perhaps already turned away from the vehicle controls to look out through the rear window, may find it inconvenient to turn back to the controls to find the rear wiper activation switch.

SUMMARY OF THE INVENTION

This invention provides wiper control apparatus for a motor vehicle which allows normal independent control of front and rear wipers but which automatically turns on the rear wiper when the front wiper is operating and the vehicle is operated in reverse. It accomplishes the latter by sensing the reverse condition of the vehicle transmission as well as the operating condition of the front wiper and activating the rear wiper as long as both conditions are simultaneously present. As soon as one of the conditions is no longer present, the rear wiper is returned to its park position and deactivated.

SUMMARY OF THE DRAWINGS

The single FIGURE shows a circuit diagram for a wiper control apparatus according to the invention.

DESCRIPTION OF A PREFERRED EMBODIMENT

Referring to the single FIGURE, a motor vehicle of normal construction includes a windshield 2 having front wipers 3 driven through repeating cycles of a front wipe pattern by a motor 20 and a front wiper drive mechanism 4 of normal construction and a rear window 5 having a rear wiper 6 driven through repeating cycles of a rear wipe pattern by a motor 40 and a rear wiper drive mechanism 7 of normal construction. Such apparatus is known in the prior art.

An electric DC power supply is symbolized by battery 10; and an ignition switch 11 is effective to connect or disconnect battery 10 from a power supply line 12. The motor vehicle further includes a wiper control system comprising a front wiper control 13, a rear wiper control 14, a driveline transmission including a reverse operation indicator 15 and a front/rear wiper interconnection circuit 16.

Motor 20 is shown in connection with front wiper control 13 which, together with front wiper drive mechanism 4 and wipers 3, comprise a front wiper mechanism. Motor 20 is a three brush, permanent magnet, DC motor having a grounded common brush 21, a low speed brush 22 and a high speed brush 23. Front wiper control 13 further includes a front wiper control switch apparatus, generally indicated at 25. Control switch apparatus 25 includes stationary contacts 26, 27, 28 and 29, with contact 26 connected to supply line 12, contact 27 connected to high speed brush 23 of motor 20, and contact 28 connected to low speed brush 22 of motor 20. Control switch apparatus 25 further includes a sliding contact 30, which is shown in an OFF condition in which it connects contacts 28 and 29 and which may be moved to a LOW condition in which it connects contacts 26 and 28 and a HIGH condition in which it connects contacts 26 and 27. In the LOW condition, control switch apparatus 25 thus connects motor 20 across battery 10 through low speed brush 22 for low speed wiper operation; and in the HIGH condition, switch apparatus 25 connects motor 20 across battery 10 through high speed brush 23 for high speed wiper operation.

Stationary contact 29 of control switch apparatus 25 is connected to the movable contact 33 of a park switch 32, which has stationary contacts 34 and 35 connected to ground and to supply line 12, respectively. Park switch 32 also has a mechanical cam apparatus, not shown, driven by motor 20 to activate movable contact 33 in the normal manner, as follows. The condition of park switch 32 shown in the FIGURE, in which movable contact 33 is grounded through stationary contact 34, is attained only in a small wipe angle in a position of the front wiper where it is desired to park the wiper blade when the front wiper is not operating: for example, in the position shown in the FIGURE. In all other positions of the front wiper, movable contact 33 is activated to the alternate condition, in which it is connected to stationary contact 35 and thus to power supply line 12. When control switch apparatus 25 is in its OFF condition, contact 30 thereof will continue to connect motor 20 across battery 10 through control switch apparatus 25 and park switch 32 until the wiper reaches its park position, so that the front wiper is automatically returned to its park position when switch apparatus 25 is put in its OFF condition and then parked with dynamic braking through control switch apparatus 25 and park switch 32.

Rear wiper control 14 likewise forms a rear wiper mechanism with rear wiper drive mechanism 7 and rear wiper 6. Motor 40, however, is shown as a single speed, two brush, permanent magnet DC motor 40 connected between a movable contact 42 of a rear control switch 41 and ground. Control switch 41 has a stationary contact 43 connected to supply line 12 and another stationary contact 44 and is shown in an off condition in the FIGURE. Rear wiper control 14 also includes a park switch 45 similar to park switch 32 with stationary contacts 47 and 48 similarly connected to supply line 12 and ground, respectively. Movable contact 46 of park switch 45 is normally connected, through a movable armature contact 51 and stationary contacts 52, 53 of a relay 50 in interconnection circuit 16, to contact 44 of control switch 41. With control switch 41 in its off condition as shown, this provides automatic return of the rear wiper to a rear park condition, shown in the FIGURE, and dynamic braking through switches 41 and 45 in a manner similar to that described for the front wiper.

Front/rear interconnection circuit 16 includes relay 50, already mentioned, in which movable armature contact 51 normally bridges stationary contacts 52, 53 to connect movable contact 46 of park switch 45 to contact 44 of switch 41 as described above. Contacts 52 and 53, together with contact 51, thus comprise a disconnect switch in series with contact 44 of control switch 41 and park switch 45. Relay 50 further includes an activating coil 58 which, when activated with a current therethrough, activates armature contact 51 into another condition bridging a pair of contacts 54, 55 which, when bridged, connect movable contact 42 of control switch 41 to the cathodes of two diodes 56 and 57, the anodes of which are connected to high speed brush 23 and low speed brush 22, respectively, of motor 20. Contacts 54 and 55, together with contact 51, comprise an interconnect switch effective to connect or disconnect rear motor 40 from front control switch apparatus 25. Thus, when coil 58 of relay 50 is activated, contact 51 will move to connect the front and rear wiper controls 13 and 14 so that activation of front wiper motor 20, in either low or high speed, by switch apparatus 25 also causes activation of rear wiper motor 40, with the latter wiper mechanism being automatically parked by its own wiper control when relay 50 is deactivated. Of course, the rear wiper control remains independently activatable through its own wiper control switch 41 when relay 50 is deactivated. If control switch apparatus 25 is moved to its OFF condition while relay 50 is activated, the activation of rear wiper motor 40 will be controlled by park switch 32 of front wiper motor 20; and there is the possibility that, when front wipers 3 are parked, rear wiper 6 could be stopped somewhere in its wipe pattern. As will be seen, this is an unlikely occurrence. However, if it occurs, deactivation of relay 50 will reconnect stationary contacts 52, 53 to finish parking rear wiper 6.

Reverse operation indicator 15 includes a reverse indicator lamp 60 connected in series with a driveline transmission mounted reverse sensing switch 61 between supply line 12 and ground. Switch 61 is open when the driveline transmission is in a forward mode of operation and closed when it is shifted into a reverse mode of operation. Lamp 60 may be a normal vehicle backup light, while switch 61 is the reverse switch normally provided in vehicle driveline transmissions to activate such a lamp. Such apparatus is normally included on motor vehicles and is well known in the prior art. However, in this apparatus, coil 58 of relay 50 is connected across lamp 60 so as to be activated through switch 61 along with lamp 60 when the driveline transmission is shifted for reverse vehicle operation. Thus, when the transmission is shifted to reverse, relay 50 is activated to provide rear wiper operation automatically along with front wiper operation; and, when the transmission is shifted out of reverse, relay 50 is deactivated to its normal condition in which rear and front wiper operation are independently controlled, with rear wiper 6 being automatically parked in its normal park condition unless separately activated by switch 41.

It is unlikely that front wiper control switch 25 will be moved to its OFF condition with the vehicle transmission still in reverse (and relay 50 thus still activated). However, if this does occur, the standard ignition interlock will prevent ignition switch 11 from being opened with the vehicle transmission still in reverse. When the vehicle transmission is next shifted out of reverse, ignition switch 11 will still be closed, relay 50 will be deactivated, and rear wiper 6 will then be parked in its normal park position determined by park switch 45. The vehicle operator need only wait and allow this to happen before opening ignition switch 11.

The embodiments of the invention in which an exclusive property or privilege is claimed are defined as follows:

1. A wiper control apparatus for a motor vehicle having a windshield, a rear window, an electric power supply, and a motor driveline including a transmission having both forward and reverse modes of vehicle operation;

a front wiper mechanism including a front wiper, a front electric motor mechanically connected to drive the front wiper through repeating cycles of a wipe pattern on the windshield, and a front control switch having ON and OFF conditions, the front control switch in its ON condition connecting the front electric motor to the electric power supply for activation thereof and in its OFF condition connecting the front electric motor to the electric power supply through a front park switch activated by the front electric motor to an open condition in a desired park position of the front wiper and otherwise to a closed condition, for automatic front wiper park;

a rear wiper mechanism including a rear wiper, a rear electric motor mechanically connected to drive the rear wiper through repeating cycles of a wipe pattern on the rear window, and a rear control switch having ON and OFF conditions, the rear control switch in its ON condition connecting the rear electric motor to the electric power supply for activation thereof and in its OFF condition connecting the rear electric motor to the electric power supply through a rear park switch and a disconnect switch in series, the rear park switch being activated by the rear electric motor to an open condition in a desired park position of the rear wiper and otherwise to a closed condition, for automatic rear wiper park when the disconnect switch is closed;

reverse detecting means responsive to the transmission for detecting the reverse mode of vehicle operation to generate a reverse signal; and circuit means comprising an interconnect switch having a closed condition connecting the rear electric motor to the front control switch for activation thereby along with the front electric motor and an open condition disconnecting the rear electric motor from the front control switch and further comprising switch activation means responsive to the reverse detecting means to provide the closed condition of the interconnect switch and the open condition of the disconnect switch in response to the reverse signal and otherwise to provide the closed condition of the disconnect switch and the open condition of the interconnect switch.

* * * * *